United States Patent [19]

Lafforgue et al.

[11] Patent Number: 5,016,892

[45] Date of Patent: May 21, 1991

[54] DRILL TOOL HOLDER

[75] Inventors: Jean-Jacques Lafforgue, Tournon; Claude Schwartz, Gournay, both of France

[73] Assignee: Societe De Prospection ET D'Inventions Techniques (S.P.I.T.), Bourg-les-Valance Cedex, France

[21] Appl. No.: 330,014

[22] Filed: Mar. 29, 1989

[30] Foreign Application Priority Data

Apr. 1, 1988 [FR] France ........ 88 4369

[51] Int. Cl.[5] ........ B23B 31/22

[52] U.S. Cl. ........ 279/82; 279/19; 279/1 Q; 173/48

[58] Field of Search ........ 408/240, 239 R, 239 A; 279/69, 78, 74, 75, 76, 1 B, 19, 19.2, 19.3-19.7, 66, 70, 1 A, 82, 81, 85, 71, 72; 173/48, 1 Q

[56] References Cited

U.S. PATENT DOCUMENTS

| | | | |
|---|---|---|---|
| Re. 31,755 | 12/1984 | Wanner et al. | 279/1 B X |
| 1,283,173 | 10/1918 | Heinkel | 279/72 X |
| 2,386,469 | 10/1945 | Iversen | 279/74 |
| 2,501,758 | 3/1950 | Cauchois | 279/70 |
| 3,536,335 | 10/1970 | Schmuck | 279/81 |
| 4,629,375 | 12/1986 | Lieser | 279/75 X |
| 4,691,929 | 9/1987 | Neumaier et al. | 279/19.3 |

FOREIGN PATENT DOCUMENTS

| | | | |
|---|---|---|---|
| 874855 | 4/1953 | Fed. Rep. of Germany | 279/75 |
| 3536132 | 4/1987 | Fed. Rep. of Germany | 279/75 |
| 3637354 | 5/1988 | Fed. Rep. of Germany | 279/19.5 |
| 1539346 | 1/1979 | United Kingdom . | |

*Primary Examiner*—Larry I. Schwartz
*Assistant Examiner*—Robert Schultz
*Attorney, Agent, or Firm*—Schwartz & Weinrieb

[57] ABSTRACT

A drill tool-holder comprises close to its end at least two radial cavities each opening outwardly of the tool-holder and inwardly of its axial bore, and each adapted for housing a ball, or cylinder, the outlet orifices of the cavities being dimensioned so that the ball, or cylinder, may be introduced from the outside into these cavities, but cannot come out thereof towards the inside of the tool-holder axial bore, which tool-holder is characterized by the fact that there is associated therewith a piece made from a hard material (3) whose body (10) has the same form as the cavities and may be housed therein without play, and has on each of its opposite faces a projecting portion (11,12) in the form of a small bar.

9 Claims, 1 Drawing Sheet

DRILL TOOL HOLDER

FIELD OF THE INVENTION

The present invention relates to percussion drills whose tool-holder comprises at least one locking part, ball or cylinder, which is movable in a substantially radial direction so as to limit the axial mobility or movement the shank or drill by penetrating cavities thereof which are closed at both ends thereof as viewed in the axial direction.

BACKGROUND OF THE INVENTION

Within some conventional drills of the aforenoted type, such as those described for example in FR 1 588 841 (HILTI), these balls, or cylinders, provide not only locking of the components in the axially extending sliding mode but also locking of the same in the rotational mode of driving device.

Within other conventional drill systems, such as those described in FR-A-76 34 195 (BOSCH) the tool-holder includes at least one rotational driving device in the form of a key.

It can be seen that the bits used within the drills of the first type (HILTI) do not have axial grooves provided upon their shanks and therefore cannot be used within drills of the second type (BOSCH).

The purpose of the invention is precisely to make it possible to use either a bit provided with a drive groove or a bit not provided with a drive groove within the same tool-holder.

It is known from European Patent Application 0 223 738 which corresponds to DE 35 39912 that this result can be obtained by providing within the wall of the tool-holder radially open cavities of different shapes which respectively correspond to a locking ball or cylinder and to a driving element in the form of a key and a setting casing which is adapted to cause radial introduction into the cavities or to permit the escape from the cavities the corresponding ball or driving element.

As can be appreciated, this type of structure is quite complicated and therefore relatively expensive.

OBJECT OF THE INVENTION

The invention has for its object to provide a structure which is capable of achieving the same results as those exhibited by the prior art devices but with simpler and therefore less costly means and also a structure comprising simpler type of embodiment.

SUMMARY OF THE INVENTION

Accordingly, the present invention comprises a drill tool-holder of the type having close to one end thereof least two radial cavities each opening outwardly of the tool-holder and inwardly of its axial bore, and each adapted to serve as a housing for a ball, or cylinder, the outlet orifices of the cavities being dimensioned so that the ball, or cylinder, may be introduced from a position external of the tool-holder and into these cavities, but wherein the balls or cylinders cannot pass through the cavities and into the tool-holder axial bore, and wherein further, the balls or cylinders are prevented from escaping to the outside of the tool-holder by means of a simple annular ring, characterized by the fact that in addition to the locking balls or cylinders there is associated therewith at least one piece fabricated from a hard material and whose body has the same configuration as that of the cavities so as to be housed therein without play, and wherein each of its opposite faces has a projecting portion in the form of a small bar, one of the projecting portions having a form such that it can be used as a driving key and an annular ring securely retaining both the balls or cylinders and the associated piece when these are housed within the cavities.

When this associated piece is housed within one of the cavities, one of the bars projects into the axial bore of the tool-holder and may serve as a device for driving a bit, having an axial groove having a shape corresponding to that of the bar, in a rotational mode.

The absence of this associated piece and possible replacement thereof by means of a ball, or cylinder, makes it possible to use a bit with or without an axial drive groove.

In accordance with a particular embodiment of the associated piece, and similarly with respect to the opening cavities of the bit holder, the body of this piece has the configuration of an oblong truncated cone having on one side a prismatic projecting bar serving as a drive means and on the other side a projecting parallelepipedic bar.

The use of this associated piece may require the use of a retention means, such as, for example a ring having a configuration corresponding to that of the particular shape of this piece.

BRIEF DESCRIPTION OF THE DRAWINGS

By means of a non-limiting example, improved embodiments of the tool-holder of the invention have been shown in the accompanying drawings in which.

DETAILED DESCRIPTION OF THE ILLUSTRATED EMBODIMENTS

Figure 5:
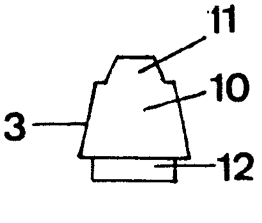
FIG. 5 is an end elevation, on a large scale, of the drive means of the tool-holder of FIG. 3.
Figure 6:
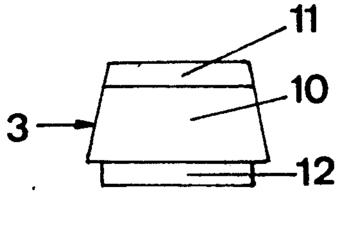
FIG. 6 is a side elevation view of the drive means of FIG. 5.

As shown in FIGS. 1 to 4, the tool-holder 1 has, close to its end, two cavities 2, 2' opening radially outwardly of the tool-holder 1 and radially inwardly of the axial bore thereof. These cavities have an inner surface in the form of an oblong or elongated truncated cone, which conforms with the shape of the external surface of the central part of an associated drive means 3 which is best seen in FIGS. 5 and 6. The end of the tool-holder 1 is covered by means of a two part cap 4, 4' which is fixed thereto by "snap fitting" the same upon end 5 of holder 1.

Figure 1:
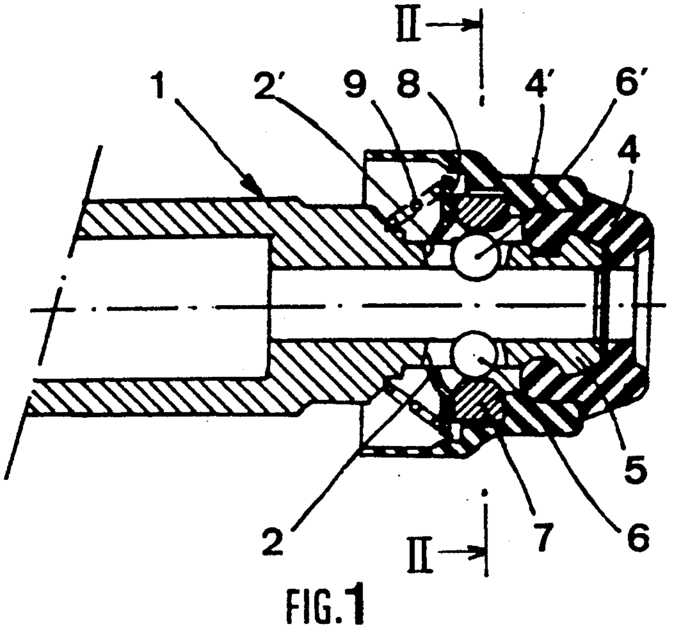
FIG. 1 is an axial sectional view of one end of a tool-holder ready to receive a bit without an axial groove drive means.
Figure 2:
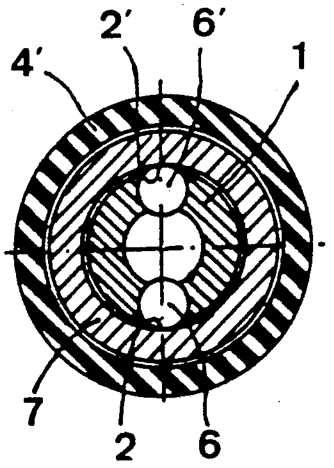
FIG. 2 is a sectional view through line II—II of FIG. 1.

In the condition shown in FIGS. 1 and 2, a ball 6, 6' is housed within each of cavities 2, 2' whose inner shape has dimensions such that it allows its respective ball to be inserted therein but prevents each ball from passing completely therethrough and into the central bore of the tool-holder. In fact, each cavity only allows each ball 6, 6' to project slightly into the central bore. A ring 7 retains the balls within their housings, and applied against shoulders portions of cap 4' by means of a disk 8 which is subjected to the action of a spring 9.

Figure 3:
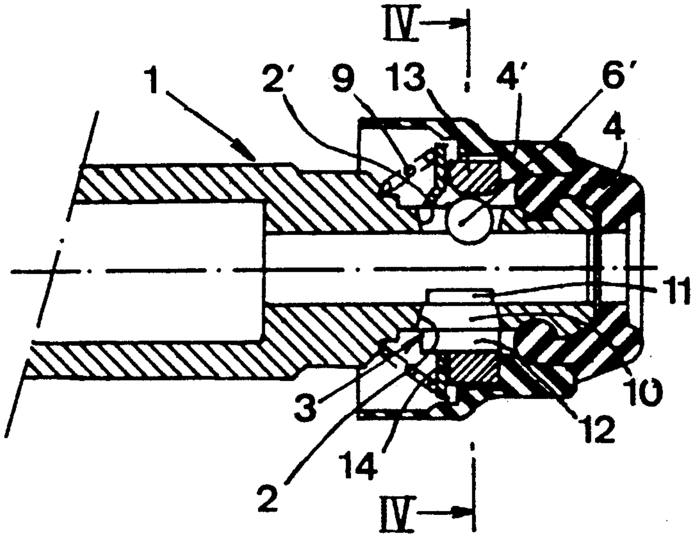
FIG. 3 is an axial sectional view of one end of a tool-holder ready to receive a drill bit with an axial drive groove means.
Figure 4:
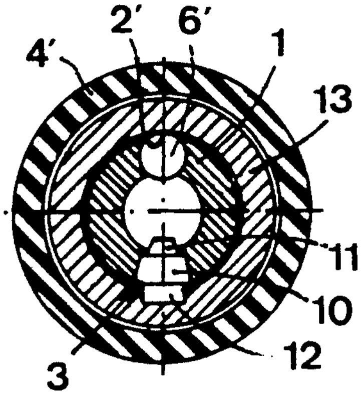
FIG. 4 is a sectional view through line IV—IV of FIG. 3.

In the condition shown in FIGS. 3 and 4, ball 6 has been replaced by means of piece 3 which is intended to serve as a means for rotatably driving a tool which is provided with an axial groove.

This piece 3, made from sintered metal for example, comprises a central part 10 in the form of an oblong truncated cone which is housed, without play, within the cavity 2 of the tool-holder 1. It is extended, on one side thereof by means of a prismatic bar 11, which projects into the central bore of the tool-holder and which will serve as the drive means. It is extended, on the other side, by means of a parallelepipedic bar 12. This piece 3 and ball 6' are retained by within their respective cavities by means of a ring 13 which is biased against the shoulder portions of cap 4' by means of a disk 14 which is subjected to the biasing action of spring 9.

It can be seen that ring 13 is distinguished from ring 7 so that the same accommodates the configuration of bar 12. Disk 14 is similarly distinguished from disk 8 so as to accommodate to the flat lateral surface of ring 13.

The pieces 3 having the shape of small prismatic bars may have a structure such that they nearly coincide by means of their parts 11 with driving faces of the tool and therefore define an optimal working capacity for the rotative transmission.

It can be seen that the tool-holder of the invention allows the workman, at will, according to the configuration of the tool he wishes to use within the tool-holder, to manually exchange a locking element for a driving element.

The tool-holder according to the invention requires a very small number of pieces which are not costly, is easy to disassemble, and it makes possible to easily remedy the wear of the elements by means of a simple exchange of pieces which can be made by the workman himself without specific equipment.

Obviously, many modifications and variations of the present invention are possible in light of the above teachings. It is therefore to be understood that within the scope of the appended claims, the present invention may be practiced otherwise than as specifically described herein.

We claim:

1. A tool-holder system for interchangeably housing a plurality of tools, comprising:
- an annular cylindrical housing portion having a bore extending axially therethrough for receiving a portion of a tool to be secured within said housing portion;
- cavity means, defined within a sidewall portion of said housing portion and extending through said sidewall portion of said housing so as to provide communication between a position external to said housing portion and said bore of said housing portion;
- a locking element having a first predetermined configuration;
- a driving element having a second predetermined configuration which is different from said first predetermined configuration of said locking element;
- said cavity means having a predetermined configuration for alternatively housing either said locking element having said first predetermined configuration or said driving element having said second predetermined configuration, and wherein said predetermined configuration of said driving element is substantially the same as that of said cavity means while said predetermined configuration of said locking element is substantially different from that of said cavity means such that said locking element or said driving element can be introduced into said cavity means from said position external to said housing portion so as to only partially project into said axial bore of said housing portion in order to perform its respective locking or driving function with respect to said tool disposed within said housing portion; and
- means mounted upon said housing portion of said tool holder system and disposed externally of said housing portion for engaging said driving or locking element disposed within said cavity means and for retaining said driving or locking element within said cavity means so as to, in turn, engage said tool disposed within said tool holder housing portion and thereby achieve said driving or locking operation in connection therewith,
- whereby the same cavity means may be employed so as to selectively house both said locking or driving elements depending upon the particular type of tool being disposed and held within said tool holder housing portion.

2. A tool-holder system as set forth in claim 1, wherein:
- said locking element comprises a ball.

3. A tool-holder system as set forth in claim 3, wherein:
- said locking element has a cross section configuration as that of a cylinder.

4. A tool-holder system as set forth in claim 1, wherein:
- said driving element and said cavity means both have a predetermined configuration comprising an elongated truncated cone.

5. A tool-holder system as set forth in claim 4, wherein:
- said elongated truncated cone-shaped driving element has a prismatic bar integrally formed upon one side of said driving element for serving as a driving key, and a parallelepipedic bar integrally formed upon an opposite side of said driving element.

6. A tool-holder system as set forth in claim 5, wherein said engaging and retaining means comprises:
- an annular retention ring having a substantially flat surface portion for engaging said parallelepipedic bar of said driving element so as to retain said driving element within said cavity means.

7. A tool-holder system as set forth in claim 6, wherein said engaging and retaining means further comprises:
- an annular disk disposed at a predetermined axial position along said housing portion for engaging said annular retention ring; and
- spring biasing means mounted upon said housing portion and engaged with said annular disk so as to maintain said annular disk engaged with said annular retention ring.

8. A tool-holder system as set forth in claim 1, wherein:
- said cavity means comprises a pair of diametrically opposed cavities.

9. A tool-holder system as set forth in claim 1, wherein:
- said driving element is fabricated from sintered metal.

* * * * *